Figure 1:
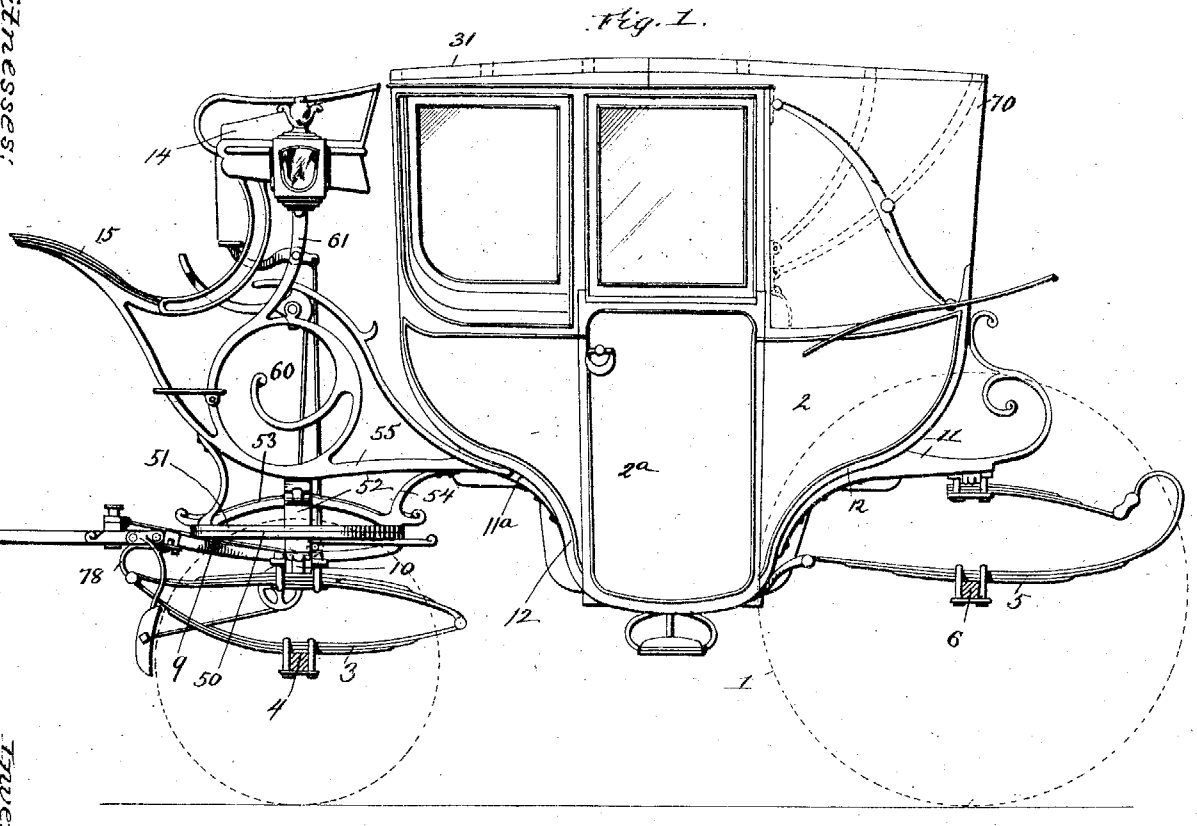

3 Sheets—Sheet 1.

W. F. DOWNEY.

CARRIAGE.

No. 11,567. Reissued Sept. 8, 1896.

Witnesses:
C. H. Rader
R. A. Matthews.

Inventor
Wm. F. Downey
By James J. Sheehy
Attorney

W. F. DOWNEY.

CARRIAGE.

No. 11,567. Reissued Sept. 8, 1896.

Witnesses:
C. A. Rauder
R. F. Matthews.

Inventor
Wm. F. Downey
By James J. Shelby
Attorney

W. F. DOWNEY.

CARRIAGE.

No. 11,567. Reissued Sept. 8, 1896.

Witnesses:
H. A. Rader
R. O. Matthews.

Inventor
Wm. F. Downey
By James J. Shelby
Attorney.

UNITED STATES PATENT OFFICE.

WILLIAM F. DOWNEY, OF WASHINGTON, DISTRICT OF COLUMBIA.

CARRIAGE.

SPECIFICATION forming part of Reissued Letters Patent No. 11,567, dated September 8, 1896.

Original No. 532,649, dated January 15, 1895. Application for reissue filed July 18, 1895. Serial No. 556,537.

*To all whom it may concern:*

Be it known that I, WILLIAM F. DOWNEY, a citizen of the United States, residing at Washington, in the District of Columbia, have invented certain new and useful Improvements in Carriages; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in carriages, and more particularly to that kind known as "close carriages, landaus," &c., the bodies of which are spring-supported, and which, as now constructed, are made very heavy, by reason of the present mode of construction making it necessary in order to afford the sufficient strength.

One of the objects of my invention is to provide a carriage of the type mentioned embodying such a construction and arrangement of parts that the weight of the foot-board and driver's seat and seat-support, together with the weight of the driver and footman, when they are in their positions, is removed from the body and rear axle and imposed on the front axle, and at the same time the weight on the foot-board is utilized as a counterbalance for the weight of the body and its occupants, so that a proportionate part thereof will be borne by the front and rear axles; and one, which as a result of the construction and arrangement above mentioned, may be built very light in weight without sacrificing strength and may be coupled up so that its length over all will be much shorter than has heretofore been possible, and which in consequence of the short coupling and the distribution of the weight on the rear and front axles may be drawn much easier than the carriages at present in use, in which the imposition of the far greater portion of the weight of the body, its occupants, the driver's seat and seat-support, and the driver upon the rear axle causes a very heavy drag.

Another object of the invention is to provide the doors of the carriage with vertically-sliding counterbalanced sashes and means for supporting the sashes in various elevated positions, which shall effectively prevent the weather from entering the carriage and at the same time make a neat finish; and still another object of the invention is to provide a driver's seat adapted to serve the additional function of a receptacle for various appurtenances of the carriage, and having a hinged cover which will close the receptacle and yet permit of ready access being had to the interior thereof when desired.

Other objects and advantages of the invention will be fully understood from the following description and claims.

In connection with the carriage I have shown an improved brake mechanism and a horse-detaching device, but I do not make claims thereto in this application, as I have filed applications covering said improvements, the brake mechanism being serially numbered 495,196, and the horse-detacher being serially numbered 495,197.

Figure 2:
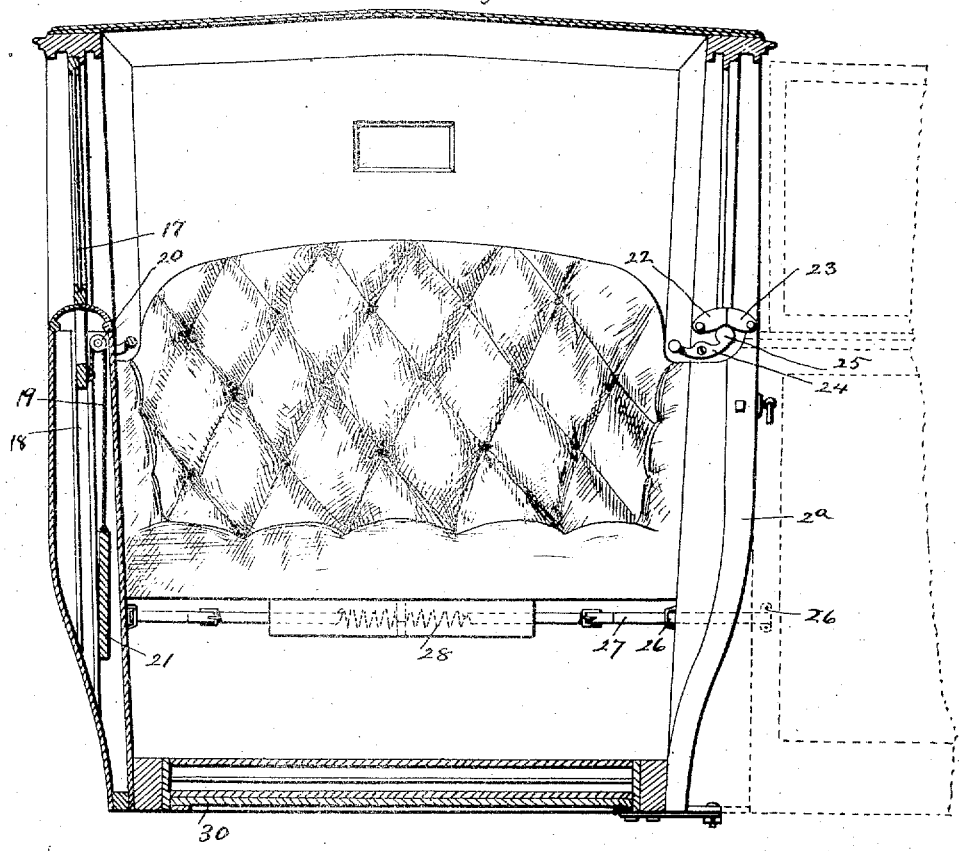
Figure 12:
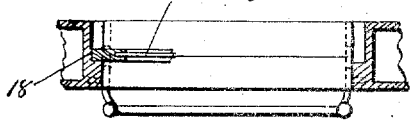
Figure 13:
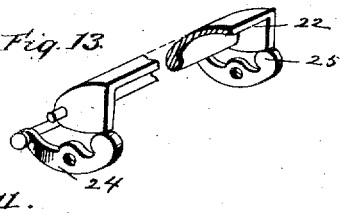
Figure 11:
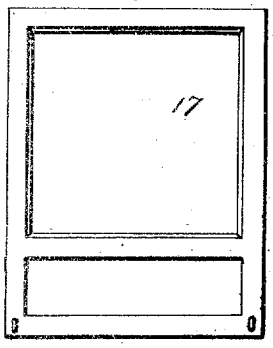
Figure 5:
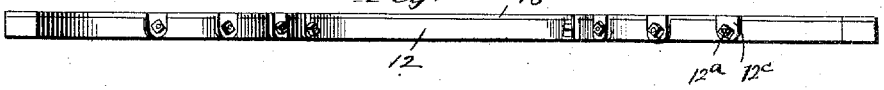
Figure 6:
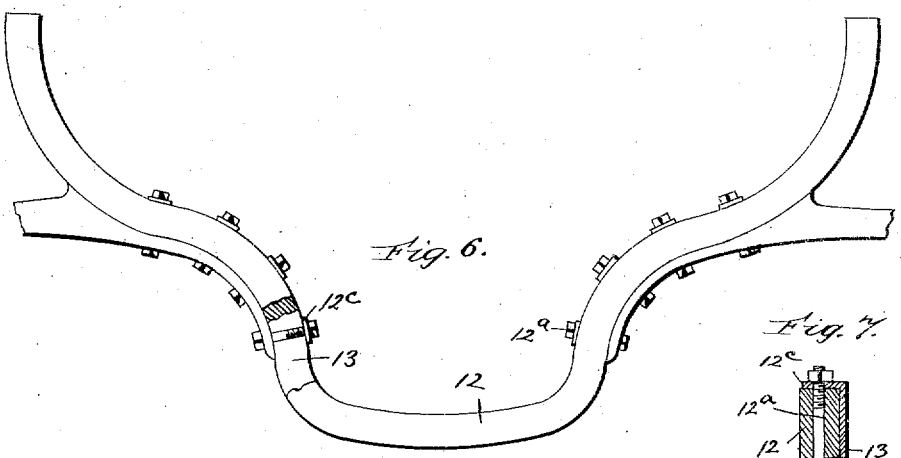
Figure 7:
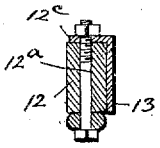
Figure 4:
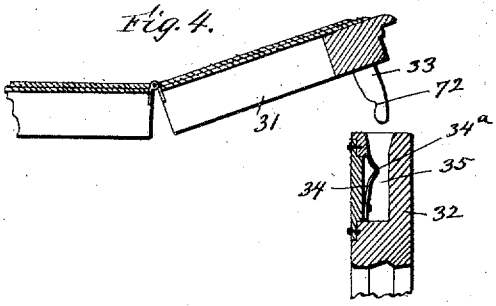
Figure 3:
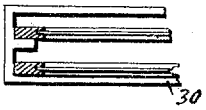
Figure 10:
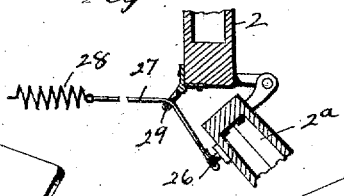
Figure 8:
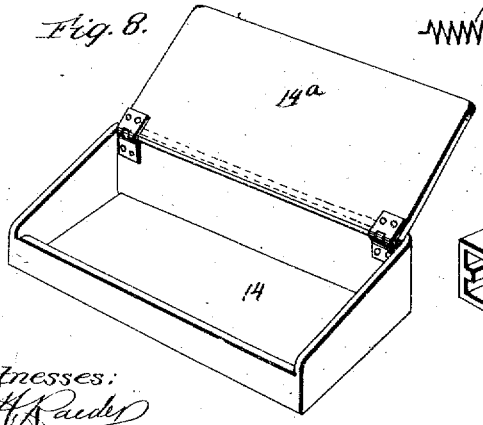
Figure 9:
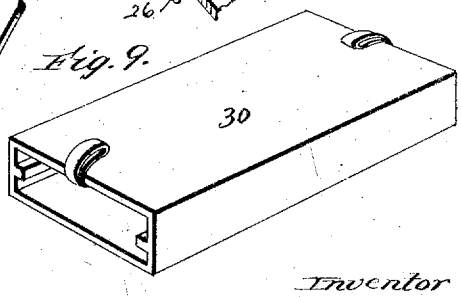

In the accompanying drawings, Figure 1 is a side elevation. Fig. 2 is a cross-section. Fig. 3 is a detail of the receptacle for holding the front lights. Fig. 4 is a detail of the hinged front top section. Fig. 5 is a plain view of one of the rockers. Fig. 6 is a side view of one of the rockers. Fig. 7 is a cross-section of the rocker. Fig. 8 is a detail perspective view of the driver's seat and receptacle. Fig. 9 is a detail perspective view of the holder for front lights. Fig. 10 is a detail of the door-closing device. Fig. 11 is a detail of one of the windows, and Figs. 12 and 13 are details of the means for operating the hinged covers.

Like figures of reference indicate like parts wherever they occur.

1 1 are the wheels of the carriage, which are shown by dotted lines.

The body 2 of the carriage is supported by the springs 3 upon the axle 4 and the springs 5 upon the rear axle 6. The springs 3 5 are clipped to the axles in the usual manner. The springs 3 are clipped to the bolster 10 and the front axle 4 in the usual manner, and the rear springs 5 are clipped to the rear side bars 11, which are preferably composed of metal and are securely bolted to the rockers 12. The rockers 12 are made much lighter than has been possible heretofore, owing to the fact of the long coupling which has been practiced, and also owing to the doing away with the angles found in the rockers now in use. I have entirely dispensed with angles and have constructed the rockers by uniting curves in such a way as to give much stronger effect to the materials used. Alongside of each wooden rocker 12 is a metallic rocker 13 of the same configuration, which can be made quite thin, yet sustaining much weight, because the strain is upon the edge of the metal or in the direction of the greatest width thereof. At suitable intervals where the side bars 11 11[a] are bolted to the wooden rockers 12, lips 12[c] are formed upon the metallic rockers 13, which extend across the wooden rockers and receive the ends of the securing-bolts 12[a], so as to materially strengthen the wooden rockers and enable the same bolts 12[a] to connect the side bars, the wooden rockers 12, and the metallic rockers 13.

50 indicates the lower section of an ordinary fifth-wheel, which is mounted on the stay-bars 9 and bolster 10 in the ordinary or any suitable manner, and preferably has its center arranged above the axle 4 in the same vertical plane as the clips connecting the bolster 10 and springs 3. 51 indicates the upper section of the fifth-wheel, which is connected with the lower section by a central king-bolt. 51 indicates the upper bolster, which is connected to the upper fifth-wheel section 51 above and in about the same plane as the clip connecting the bolster 10 and springs 3, and 53 indicates a longitudinal central bar, which is connected to the fifth-wheel and bolster 52, and has its rear end provided with the lateral branches 54, which are connected to the side bars 11[a].

The side bars 11[a] extend forward from the rockers and are suitably connected to the branches 54 of bar 53 and to the bolster 52, and from the point of their attachment to the bolster 52 they extend upwardly and forwardly, preferably in a graceful curve, as shown, to form the support for the foot-board 15, which it is desirable to have high, as shown, in order to permit of the draft-animals being hitched close to the carriage, so as to enable them to more easily draw the load.

The driver's seat 14 is shown as arranged above the fifth-wheel and connection of the lower bolster 10 to the springs 3 and close to the forward end of the carriage-body 2, which is desirable, as it permits of the foot-board 15 being brought closer to the forward end of the carriage, and in consequence permits of the carriage being made shorter over all. The seat 14 is supported by bars 55 61, which extend upwardly from the side bars 11[a], as shown.

The bolster 10, fifth-wheel, bolster 52, bar 53, side bars 11[a], foot-board 15, and rest 14 constitute a lever or lever-frame 60, which has its fulcrum at an intermediate point of its length on the springs 3 where the bolster 10 is clipped to said springs. The body 2 is a weight imposed on one end of this lever or lever-frame, and when the driver and footman are in their places on the seat and foot board their weight is imposed on the foot-board or opposite or forward end of the lever or lever-frame, and consequently will counterbalance that of the body and will take a portion of the same off the rear axle and bring it upon the forward axle.

The construction and arrangement just described avoids all long reaches and permits of the carriage being coupled up much shorter than has heretofore been possible, and yet retains the graceful lines which must be present in close carriages, landaus, and carriages of similar types. It also permits of such carriages being built much lighter in weight without sacrificing strength, which is an important desideratum, and by distributing the weight upon the two axles and bringing the draft-animals close to such weight it materially lessens the draft.

The lever or lever-frame 60 has been specifically described in order to impart a clear and exact idea of the salient feature of my invention; but I would have it distinctly understood that I do not limit myself to the employment of such construction of lever or lever-frame, as any construction suitable to the purpose of my invention may be employed.

The driver's seat 14 (better shown in Fig. 10) forms a receptacle for the reception of various appurtenances of the carriage and driver, and it is provided with a hinged cover 14[a], which excludes dust from the interior of the seat-receptacle and yet permits of ready access being had to the same. The seat may be tilted over forwardly in order to permit of the front section of the top being lowered beneath it in the usual way.

The carriage-body is framed upon the rockers 12 13, having its sides, ends, and general construction the same as usual, but, as I have heretofore stated, its weight is much reduced. The doors 2[a] are constructed hollow, as is generally the case, but I propose to use a counterbalance-sash 17, which slides in vertical ways 18 and has cords 19, which pass around pulleys 20, and to the end thereof is secured the counterbalance-weight 21. A pair of hinged covers 22 23 are adapted to support the window in various elevated positions, while a portion of the frame of the window remains in the door to steady it when the door is opened. A handle-bar having arms 24 provided with cams 25, adapted to open the hinged covers 22 23, is located inside the door, as shown in Figs. 12 and 13. These covers form a uniform finish in the inside and outside and completely protect the inside of the door from anything dropping into it, as well as excluding the weather and completely shedding rain.

Among the most annoying and expensive accidents which happen to carriages is the frequent breaking of the doors, which often is caused by their striking an obstruction when the doors are open. To obviate this, I have devised a means whereby this is effectively prevented, which consists in attaching to the door, by means of a suitable eye 26, a strap 27, having its other end fastened to a suitable extension-spring 28, said strap being passed through an eye 29, secured to the corner of the frame of the carriage adjacent to the hinged side of the door, thereby making the pull in the spring direct and confining the strap 27 in a line with the seat to which the springs 28 are secured. The spring yields readily when the occupant of the carriage desires to open the door, but is sufficiently strong to wholly or at least partially close the door, bringing it within the line of the hubs, thereby protecting it from liability of being caught so as to break it. The above strap 27 acts as a stay-strap when the door has been opened to the desired distance, and a stop may be secured at the proper point on the strap, which will engage the eye 29 and effect this result, releasing the strain from the hinge.

The floor of my improved carriage is formed by a removable receptacle 30, which is so built as to receive the front lights of glass when the top is down. If desired, the case may be lined with any suitable material, and when it is in the well of the carriage its ends are tightly closed by the rockers 12 13, as shown in Fig. 2, so as to exclude dust from its interior.

The rear portion of the top 70 when constructed according to the drawings, Fig. 1, is held in its elevated position by the usual props, which are adapted to flex when the top is to be lowered.

In order to hold the front hinged section 31 of the top 70 down upon the front posts 32 of the carriage-frame, and yet permit of said section being readily disconnected and raised when desired, I provide the said posts 32 with vertically-disposed sockets 35, which may be, and preferably, are formed in the material of the posts and contain keepers preferably formed by springs 34, which are respectively provided at an intermediate point of their length with a shoulder 34ª, which has its upper and lower sides beveled or rounded, as shown, for a purpose presently described, and are connected to the walls of the sockets at their lower ends only; and I also provide the hinged section 31 upon its under side with tapered pins 33, designed to enter the sockets 35. These pins 33 are tapered so as to enable them to readily enter the sockets when the relative positions of the pins and sockets are slightly changed by swelling, shrinkage, or straining of the parts, and they are provided with indentations 72, which have their upper and lower walls beveled and are adapted to receive the shoulders 34ª when the pins are in the sockets. By virtue of the keeper-shoulders 34ª and the walls of the indentations 72 being rounded or beveled, it will be observed that the keepers 34 will automatically engage the pins when they are lowered into the sockets, and that when it is desired to disengage the pins from the keepers it is simply necessary for the driver to pull the hinged section 31 upwardly, when said section may be folded back with the portion 70 of the top.

The manner just described of fastening the hinged top-section is a vast improvement over that at present in use, in which the members of the fastening devices are frequently prevented from engaging with each other by the swelling, shrinking, or straining of the parts of the carriage and in which it is necessary for the driver to use both hands to press the keeper devices out of engagement with the pins on the hinged section before the latter can be raised by the driver pressing his head against it and in which it is necessary for the driver to enter the carriage before he can raise the hinged section.

The carriage is provided with the usual lamps, fenders, steps, &c.

The operation of the various parts of my invention is obvious from the foregoing explanations in regard to the same.

It is obvious that slight changes in construction may be made without departing from the spirit and scope of my invention.

In addition to the advantages before enumerated, the construction described permits of the king-bolt and fifth-wheel being placed close to the well of the carriage, which is desirable, as it dispenses with the objectionable neck and brings the wheel-house, or the space in which the front wheels move in turning the carriage, below the front quarter of the body.

The improved seat described is further advantageous as it obviates the cutting of the covers and other appurtenances, which is an objectionable incident to the use of the old-style boot or receptacle.

Having described my invention, what I claim is—

1. In a landau or a similar type of carriage, a driver's seat, consisting of a receptacle having a hinged cover, said cover forming the seat, and said receptacle the boot, and a foot-rest elevated so that the foot-rest is above the back of the horse or horses, and the distance between them and the vehicle is shortened, a body, a king-bolt situated so that the front wheels come into close proximity to the well of the carriage-body, a receptacle adapted to receive the front lights when they are removed, a hinged front top-section having taper-pins adapted to register with taper-sockets in the front corner-posts, securing same in locked position, except when force is applied, said pins engaging a spring in said socket, substantially as described.

2. In a landau or similar type of carriage having a spring-supported body, side-bars attached thereto extending upwardly from the bolster, each of said side-bars being forked, a seat comprising a boot or receptacle, provided with a hinged cover supported by one member of said fork, and a foot-rest supported by the other member, a king-bolt, said driver's seat and foot-rest being located forward of the king-bolt thereby causing the weight of said parts to tend to counterbalance the weight of the body, said body being provided with a movable receptacle, adapted to receive the front lights of glass when the top is lowered, said top being hinged and provided with taper-pins having notches, engaged by a spring confined with sockets formed in the front corner-posts, said pins and sockets uniting the top section detachably to the posts substantially as described.

3. In a carriage, a driver's seat comprising a receptacle and a hinged cover, an open-work seat-support formed by the front side-bars of the carriage, said receptacle forming the boot, substantially as described.

4. In a carriage a removable receptacle adapted to receive the front lights of glass when the top is lowered, said receptacle forming the floor of the well of said carriage when in position, substantially as described.

5. In a carriage, a removable receptacle forming the floor of the well, having suitable supports, said supports separating the several parts comprising the front lights of the carriage, said receptacle being provided with suitable straps, or handles, whereby said receptacle may be removed, substantially as described.

6. In a carriage-door, a pocket formed therein, a window-frame slidable in said pocket, a counterbalance-weight connected with said window, a pair of hinged covers oppositely disposed to each other, one upon either side of the pocket, said covers supporting the window when elevated and closing said pocket when the window-frame is lowered into said pocket, and means for operating said hinged covers, substantially as described.

7. In a carriage-door, a pocket formed therein, a window-frame slidable in said pocket, a counterbalance-weight connected with said window, a pair of hinged covers oppositely disposed to each other and parallel to each other, one upon either side of the pocket, said covers supporting the window when elevated upon their meeting edges and closing said pocket when the window-frame is lowered into said pocket, and means for operating said hinged covers, substantially as described.

8. In combination with a carriage, a door having a pocket provided with grooves, a window sliding in said grooves, a sash-cord, a counterbalance-weight attached thereto, a pair of hinged covers, a handle having arms provided with cam-shaped ends adapted to engage said hinged covers, the covers supporting the window when elevated, and closing the pocket when lowered, substantially as described.

9. In a carriage having a spring-supported body, the combination of front and rear side-bars, rockers formed of wooden strips and metallic strips arranged side by side; the metallic strips being disposed vertically and provided with apertured lips overlapping the wooden strips, and bolts taking through the side-bars, wooden strips of the rockers and the lips of the metallic strips of the rockers and connecting the same, substantially as specified.

10. In a carriage-body, the combination of the frame having the vertically-disposed sockets in the upper ends of its front corner-posts, and the spring-keepers arranged in said sockets and having shoulders; the upper and lower sides of which are beveled or rounded, and the top adapted to fold back and having the hinged section at its forward end and the pins on the under side of said hinged section adapted to enter the sockets in the frame; the said pins being tapered toward their free ends and provided at an intermediate point of their length with indentations having their upper and lower walls beveled or rounded, substantially as specified.

In testimony whereof I affix my signature in presence of two witnesses.

WILLIAM F. DOWNEY.

Witnesses:

K. F. MATTHEWS,

THOMAS E. TURPIN.